(12) United States Patent
Ohashi (10) Patent No.: US 8,171,969 B2
(45) Date of Patent: May 8, 2012

(54) PNEUMATIC TIRE

(75) Inventor: Toshiyuki Ohashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1050 days.

(21) Appl. No.: 12/108,071

(22) Filed: Apr. 23, 2008

(65) Prior Publication Data

US 2008/0295937 A1    Dec. 4, 2008

(30) Foreign Application Priority Data

May 29, 2007    (JP) ................ 2007-141657

(51) Int. Cl.
*B60C 11/12* (2006.01)
*B60C 11/13* (2006.01)
(52) U.S. Cl. ......... 152/209.18; 152/209.21; 152/209.23; 152/DIG. 3
(58) Field of Classification Search ............ 152/209.18, 152/209.21, 209.23, 209.24, DIG. 3
See application file for complete search history.

(56) References Cited

U.S. PATENT DOCUMENTS 6,116,310 A * 9/2000 Shinohara ................ 152/209.21

2003/0101851 A1 * 6/2003 Domange et al. ............ 76/101.1

FOREIGN PATENT DOCUMENTS

| CN | 1853965 | | 11/2006 |
|----|---------|---|---------|
| EP | 0564435 | * | 10/1993 |
| JP | 1-285409 | | 11/1989 |
| JP | 02-310108 | * | 12/1990 |
| JP | 08-197915 | * | 8/1996 |
| JP | 11-151915 | * | 6/1999 |
| JP | 2000-177329 | * | 6/2000 |
| JP | 2002-316517 | * | 10/2002 |
| JP | 2007-008303 | | 1/2007 |

OTHER PUBLICATIONS

Chinese Office Action for Application No. 200810097795.7, dated Nov. 27, 2009, with English translation, 12 pages.

* cited by examiner

*Primary Examiner* — Steven D Maki
*Assistant Examiner* — Robert Dye
(74) *Attorney, Agent, or Firm* — Fish & Richardson P.C.

(57) ABSTRACT

A sipe is formed in a block provided in a tread surface, wide portions extending in a sipe length direction are formed in each of a kick-out side and a step-in side of the sipe, and a total of heights of the wide portions in the kick-out side of the sipe is made larger than a total of heights of the wide portions in the step-in side of the sipe.

5 Claims, 6 Drawing Sheets

(a) KICK-OUT SIDE (b) STEP-IN SIDE

(a) KICK-OUT SIDE (b) STEP-IN SIDE

(a) KICK-OUT SIDE (b) STEP-IN SIDE

Fig.10

(a) KICK-OUT SIDE (b) STEP-IN SIDE

Fig.11

PNEUMATIC TIRE

BACKGROUND OF THE INVENTION

1. Field of the Invention

The present invention relates to a pneumatic tire in which a sipe is formed in a land portion of a tread surface, and is particularly useful as a studless tire.

2. Description of the Related Art

Conventionally, in a studless tire, a cut called as the sipe is formed in the land portion of a block, a rib or the like, and a traveling performance on an ice road surface having a low friction coefficient is increased on the basis of an edge effect and a drainage effect generated by the sipe. As the sipe mentioned above, there have been a linear sipe extending linearly in a sipe length direction, a waveform sipe extending like a waveform and the like, in practical use.

In this case, since a rubber is incompressible, a motion of the tread surface being in contact with the road surface becomes great in a case where a load is applied to the tire, so that an opening portion of the sipe tends to be closed. Particularly, since the tread surface tends to be moved due to its slip, the sipe is easily closed and the opening portion is narrowed, on the road surface having the low friction coefficient such as the ice road surface or the like, there is a case that the edge effect and the drainage effect to be essentially achieved by the sipe are lowered.

Accordingly, the inventor of the present invention has invented a pneumatic tire forming a sipe having a plurality of wide portions extending in a sipe length direction (refer to Japanese Unexamined Patent Application Publication No. 2007-8303). In accordance with this pneumatic tire, since a tread rubber tends to be deflected in a sipe depth direction, it is possible to absorb a deformation caused by a load applied to the tire by the wide portions, at a time when the load is applied to the tire. As a result, it is possible to inhibit an opening portion of the sipe from being narrowed so as to secure an edge effect and a drainage effect.

However, after the inventor of the present invention has conducted researches further, the following matter has been found. In other words, in the case of forming the sipe having the wide portions as mentioned above, it has been known that a ground contact pressure of a kick-out side portion 61 of a sipe 6 becomes greater than a ground contact pressure of a step-in side portion 62 conceptually shown in FIG. 11, and a ground contact pressure of a block 7 becomes uneven if a braking force is applied to the tire on the ice road surface on the basis of a tread rubber being easily deflected in a sipe depth direction. Accordingly, it can not be said that an ice braking performance (a braking performance on the ice road surface) is sufficiently achieved, and it is known that there is room for further improvement of the ice braking performance.

SUMMARY OF THE INVENTION

The present invention is made by taking the actual condition mentioned above into consideration, and an object of the present invention is to provide a pneumatic tire which can improve an ice braking performance by uniformizing a ground contact pressure, while inhibiting an opening portion of a sipe from being narrowed so as to secure an edge effect and a drainage effect.

The object can be achieved by the following present invention. That is, the present invention provides a pneumatic tire structured such that a sipe is formed in a land portion of a tread surface, wherein wide portions extending in a sipe length direction are formed in each of a kick-out side and a step-in side of the sipe, and a total of heights of the wide portions in the kick-out side of the sipe is made larger than a total of heights of the wide portions in the step-in side of the sipe.

In accordance with the pneumatic tire of the present invention, since it is possible to absorb a deformation of a tread rubber by the wide portions, it is possible to inhibit an opening portion of the sipe from being narrowed so as to secure an edge effect and a drainage effect. Further, since the total of the heights of the wide portions in the kick-out side of the sipe is larger than the total of the heights of the wide portions in the step-in side of the sipe, the tire tends to be deflected in the sipe depth direction in the kick-out side portion rather than in the step-in side portion, and it is possible to absorb more deformation caused by the load applied to the tire by the wide portions in the kick-out side at a time when the load is applied to the tire. Accordingly, in a case where the braking force is applied to the tire on the ice road surface, it is possible to decrease the ground contact pressure of the kick-out side portion of the sipe so as to uniformize the ground contact pressure applied to the land portion, whereby it is possible to improve the ice braking performance.

In the above structure, it is preferable that the height of the wide portion in the kick-out side of the sipe is larger than the height of the wide portion in the step-in side of the sipe. Therefore, even if the numbers of the wide portions are identical between the kick-out side and the step-in side, it is possible to enlarge the total of the heights of the wide portions in the kick-out side rather than in the step-in side, and it is possible to uniformize the ground contact pressure so as to improve the ice braking performance.

Further, the present invention provides a pneumatic tire structured such that a sipe is formed in a land portion of a tread surface, wherein wide portions extending in a sipe length direction are formed in each of a kick-out side and a step-in side of the sipe, the wide portion in the kick-out side of the sipe is formed as a zigzag shape generating undulation in a sipe depth direction, and the wide portion in the step-in side of the sipe is formed as a straight shape.

In accordance with the pneumatic tire of the present invention mentioned above, since it is possible to absorb a deformation of a tread rubber by the wide portions, it is possible to inhibit an opening portion of the sipe from being narrowed so as to secure an edge effect and a drainage effect. Further, since the kick-out side wide portion is formed as a zigzag shape generating ups and downs in the sipe depth direction, and the step-in side wide portion is formed as a straight shape, the tire tends to be deflected in the sipe depth direction in the kick-out side portion rather than the step-in side portion, and it is possible to absorb more deformation caused by the load applied to the tire by the kick-out side wide portion at a time when the load is applied to the tire. This is because the zigzag shaped wide portion has a larger area than the straight shaped wide portion, and tends to absorb the deformation. Accordingly, in a case where the braking force is applied to the tire on the ice road surface, it is possible to decrease the ground contact pressure of the kick-out side portion of the sipe so as to uniformize the ground contact pressure applied to the land portion, whereby it is possible to improve the ice braking performance.

Further, the present invention provides a pneumatic tire structured such that a sipe is formed in a land portion of a tread surface, wherein wide portions extending in a sipe length direction are formed as a zigzag shape generating undulation in a sipe depth direction, in each of a kick-out side and a step-in side of the sipe, and an amplitude of the wide portion in the kick-out side of the sipe is made larger than an amplitude of the wide portion in the step-in side of the sipe.

In accordance with the pneumatic tire of the present invention mentioned above, since it is possible to absorb a deformation of a tread rubber by the wide portions, it is possible to inhibit an opening portion of the sipe from being narrowed so as to secure an edge effect and a drainage effect. Further, since the kick-out side and step-in side wide portions are formed as the zigzag shape generating undulation in the sipe depth direction, and the amplitude of the kick-out side wide portion is larger than the amplitude of the step-in side wide portion, the tire tends to be deflected in the sipe depth direction in the kick-out side portion rather than the step-in side portion, and it is possible to absorb more deformation caused by the load applied to the tire by the kick-out side wide portion at a time when the load is applied to the tire. Accordingly, in a case where the braking force is applied to the tire on the ice road surface, it is possible to decrease the ground contact pressure of the kick-out side portion of the sipe so as to uniformize the ground contact pressure applied to the land portion, whereby it is possible to improve the ice braking performance.

DETAILED DESCRIPTION OF THE PREFERRED EMBODIMENTS

Embodiments of the invention will be described below with reference to the accompanying drawings.

First Embodiment

Figure 1:
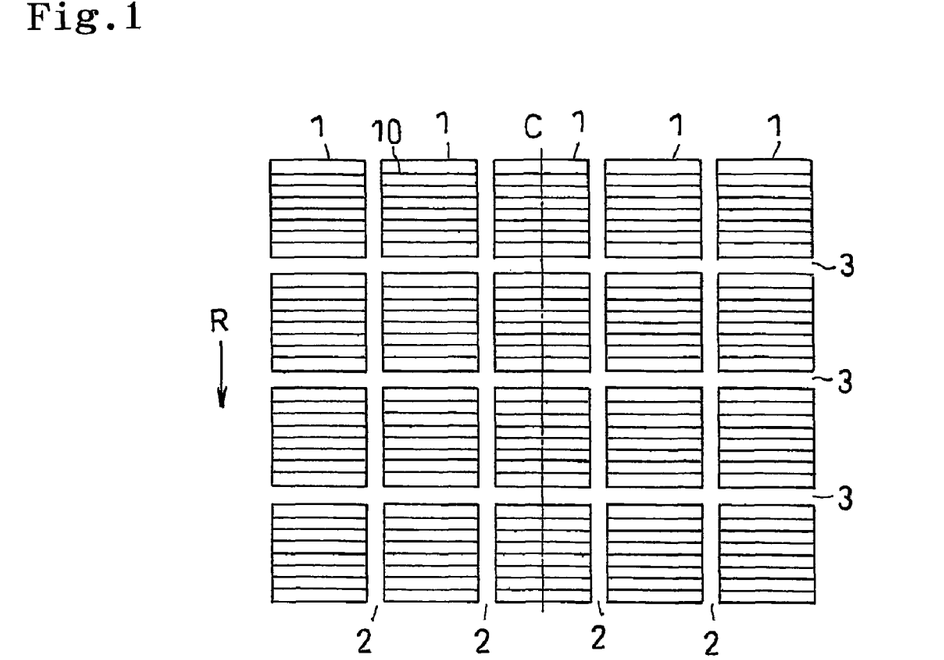
FIG. 1 is an expansion plan view showing a tread surface of a pneumatic tire in accordance with a first embodiment of the present invention.
Figure 2:
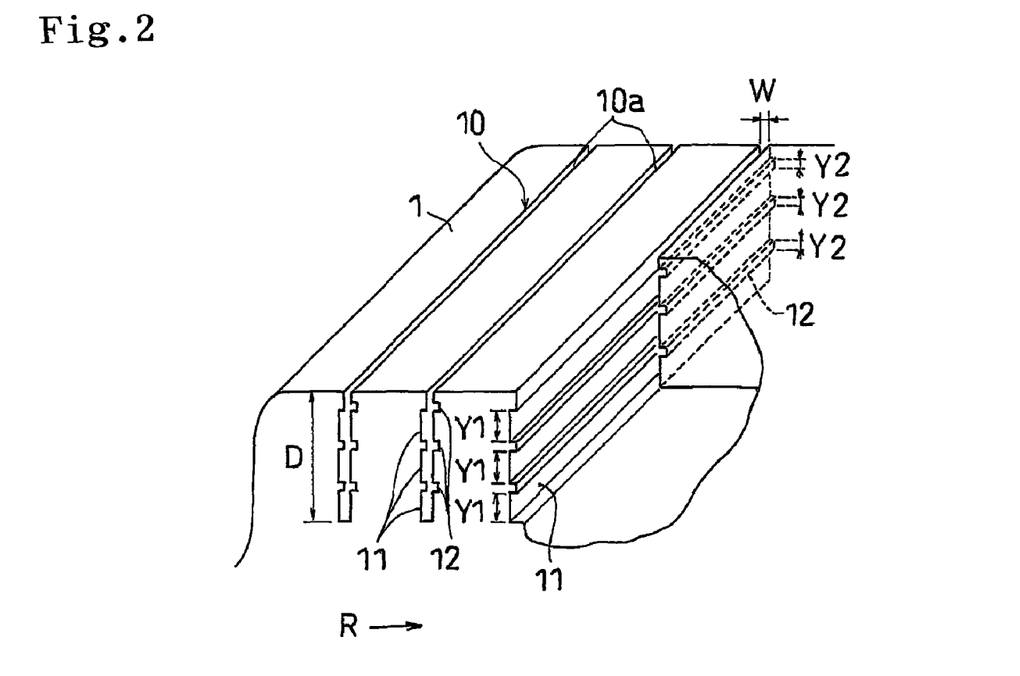
FIG. 2 is a perspective view showing a main portion of a block provided in the tread surface in FIG. 1 in a partly broken manner.
Figure 3:
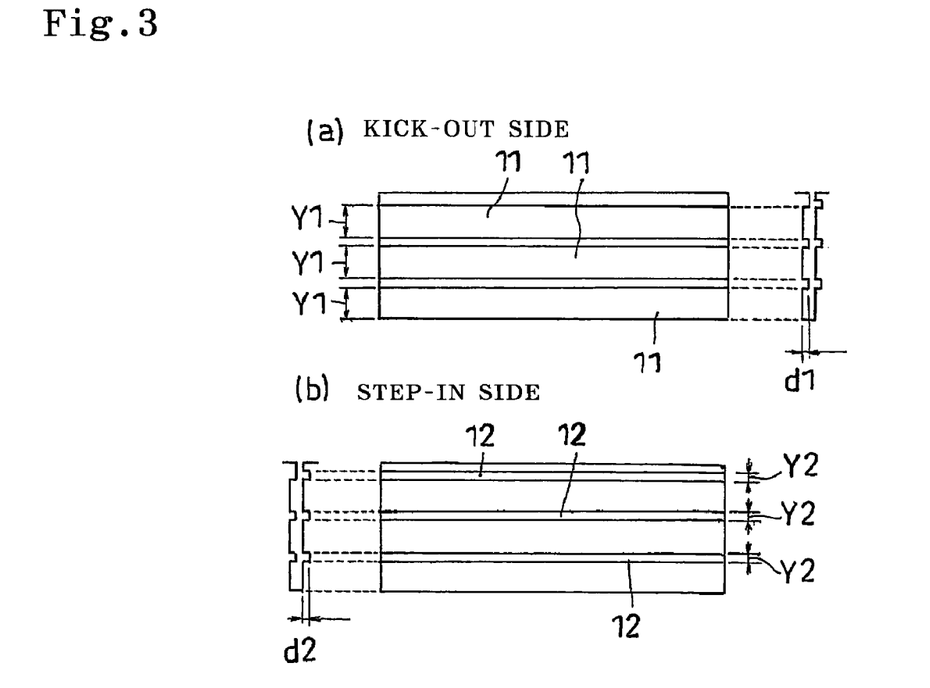
FIG. 3 is a front elevational view showing an inner wall surface of a sipe formed in the block in FIG. 2.

FIG. 1 is an expansion plan view showing a tread surface of a pneumatic tire in accordance with a first embodiment of the present invention. FIG. 2 is a perspective view showing a main portion of a block provided in the tread surface in a partly broken manner. FIG. 3 is a front elevational view showing an inner wall surface of a sipe formed in the block.

A pneumatic tire in accordance with the present embodiment is provided with a tread pattern having a plurality of blocks 1 (one example of a land portion) in which a sipe 10 is formed so as to extend linearly in a tire width direction, as shown in FIG. 1. Each of the blocks 1 is comparted by a main groove 2 extending in a tire circumferential direction and a transverse groove 3 extending in a tire width direction, and five rows of blocks 1 are arranged symmetrically with respect to a tire equator line C. In this case, an arrow R denotes a rotating direction of the tire.

As shown in FIGS. 2 and 3, a plurality of (seven in the present embodiment) sipes 10 each having a linear opening portion 10a are formed in parallel in each of the blocks 1 so as to be spaced at a predetermined interval. Wide portions 11 and 12 extending straight in a sipe length direction (a tire width direction in the present embodiment) are formed respectively in a kick-out side and a step-in side of the sipe 10. The wide portion 11 is formed by widening the sipe 10 in a kick-out side (a left side in FIG. 2), and the wide portion 12 is formed by widening the sipe 10 in a step-in side (a right side in FIG. 2).

Since the wide portions 11 and 12 are formed in the sipe 10, it is possible to absorb a deformation of the tread rubber by the wide portions 11 and 12 so as to inhibit an opening portion 10a from being narrowed, and it is possible to secure an edge effect and a drainage effect generated by the sipe 10. Particularly, in the present invention, since the wide portion is formed in both of the kick-out side and the step-in side of the sipe 10, the tread rubber tends to be deflected in the sipe depth direction with respect to a load applied from any direction, and it is possible to stably achieve the effect of inhibiting the opening portion 10a from being narrowed.

Three wide portions 11 and three wide portions 12 are formed in the present embodiment, and a total Z1 (3×Y1 in the present embodiment) of a height Y1 of the wide portion 11 is set larger than a total Z2 (3×Y2 in the present embodiment) of a height Y2 of the wide portion 12. Accordingly, the tire tends to be deflected in a kick-out side portion rather than a step-in side portion of the sipe 10, and it is possible to absorb more deformation of the tread rubber by the wide portion 11 at a time when a load is applied to the tire. Therefore, in a case where a braking force is applied to the tire on an ice road surface, it is possible to decrease a ground contact pressure of the kick-out side portion of the sipe 10 so as to uniformize a ground contact pressure applied to the block 1, whereby it is possible to improve an ice braking performance.

It is preferable that a difference (Z1−Z2) between the total Z1 and the total Z2 is 10% or more of a sipe depth D, and it is more preferable that it is 20% or more. If it is less than 10%, a difference of deflection tendency between the kick-out side portion and the step-in side portion becomes small. Accordingly, there is a tendency that the effect of uniformizing the ground contact pressure of the block 1 becomes small. Further, it is preferable that the difference (Z1−Z2) mentioned above is 60% or less of the sipe depth D, and it is more preferable that the difference (Z1−Z2) is 40% or less. If it gets over 60%, the height Y2 of the wide portion 12 becomes relatively small. Accordingly, there is a tendency that the effect of absorbing the deformation in the step-in side portion becomes small.

In the present invention, if the total Z1>the total Z2 is established, the height Y1 of the wide portion 11 may be set to the height Y2 of the wide portion 12 or less. However, in this case, there is generated a necessity of increasing the number of the wide portions 11, and there is a tendency that it becomes hard to form a blade serving as a sipe forming metal mold. Accordingly, in the present embodiment, the height Y1 of the wide portion 11 is made larger than the height Y2 of the wide portion 12. Therefore, it is possible to suitably satisfy the relation of the total height between the wide portions 11 and 12 while setting the number of the wide portion 11 identical to the number of the wide portion 12.

It is preferable that the height Y1 of the wide portion 11 is between 0.3 and 2.5 mm, and it is more preferable that it is between 1 and 1.5 mm. Further, it is preferable that the total Z1 of the height Y1 is 90% or less of the sipe depth D, and it is more preferable that it is 70% or less. Further, it is preferable that the total Z2 of the height Y2 is 10% or more of the sipe depth D, and it is more preferable that it is 30% or more. If the height Y1 is less than 0.3 mm, or if the total Z2 is less than 10% of the sipe depth D, there is a tendency that the effect of inhibiting the opening portion 10a of the sipe 10 from being narrowed becomes small. On the other hand, if the height Y1 gets over 2.5 mm, or if the total Z1 gets over 90% of the sipe depth D, a rigidity of the block 1 is lowered and an inclination becomes large excessively, and there is a case that the edge effect is inversely lowered.

It is preferable that protruding heights d1 and d2 of the wide portions 11 and 12 are 50 to 150% of a sipe width W (a thickness of the opening portion 10a). If it is less than 50%, there is a tendency that the effect of absorbing the deformation by the wide portion becomes small. If it gets over 150%, the rigidity of the block 1 is lowered, the inclination becomes large excessively, and there is a case that the edge effect is inversely lowered. As specific dimensions, there is exemplified a structure in which the protruding heights d1 and d2 of the wide portions 11 and 12 are between 0.3 and 1.2 mm, preferably between 0.3 and 0.7 mm, in a case where the sipe width W is between 0.3 and 0.5 mm.

In the light of suitably absorbing the deformation of the tread rubber, it is preferable that a plurality of wide portions 11 and 12 are formed such as the present embodiment. Further, it is preferable that the wide portion 11 and the wide portion 12 are alternately arranged in such a manner that the widened portions alternately appear toward the sipe depth direction. Accordingly, it is possible to avoid the width of the sipe becoming rapidly enlarged, and it is possible to prevent a trouble such as an irregular wear or the like.

The numbers of the wide portions 11 and 12 are not particularly limited, but there is exemplified a structure in which one to three wide portions 11 and one to three wide portions 12 are formed respectively on the basis of a relation between the heights Y1 and Y2 mentioned above and the sipe depth D. In this case, it is preferable that the sipe depth D is between 30 and 80% of the main groove 2 in the light of expressing a sufficient edge effect generated by the sipe 10, and it is preferable that the sipe width W is between 0.2 and 0.7 mm.

In the present invention, it is preferable that the sipe density is 0.05 mm/mm$^2$ or more. If the sipe density is less than 0.05 mm/mm$^2$, there is a case that the effect to be essentially achieved by the sipe 10 can not be suitably achieved. Further, in the light of suitably securing the rigidity of the block 1, it is preferable that the sipe density does not get over 0.2 mm/mm$^2$. In this case, the sipe density is a value obtained by dividing the total of the lengths of all the sipes by an area of the land portion.

In the present embodiment, there is shown the example in which the sipe 10 is constituted by the linear sipe extending linearly in the sipe length direction, however, the present invention is not limited to this, but may be constituted by a waveform sipe extending like a waveform. In the waveform sipe, since the opening portion of the sipe is hard to be narrowed in comparison with the linear sipe, it is possible to effectively secure the edge effect and the drainage effect generated by the sipe in cooperation with the effect of inhibiting the opening portion from being narrowed by the wide portion mentioned above.

The pneumatic tire in accordance with the present invention is the same as the conventional pneumatic tire except that the sipe as mentioned above is provided in the land portion, and the known material, shape, structure, manufacturing method and the like can be applied to the present invention.

The present invention can be also applied to a so-called summer tire, however, since the present invention is excellent in the ice performance, the present invention is particularly useful as a studless tire (winter tire).

Second Embodiment

Since a second embodiment has the same structure and operation as the first embodiment except the following structure of the sipe, a description will be given mainly of a different point while omitting the common points. In this case, the same reference numerals are attached to the same members and positions as the already described members and positions, and an overlapping description will be omitted.

Figure 4:
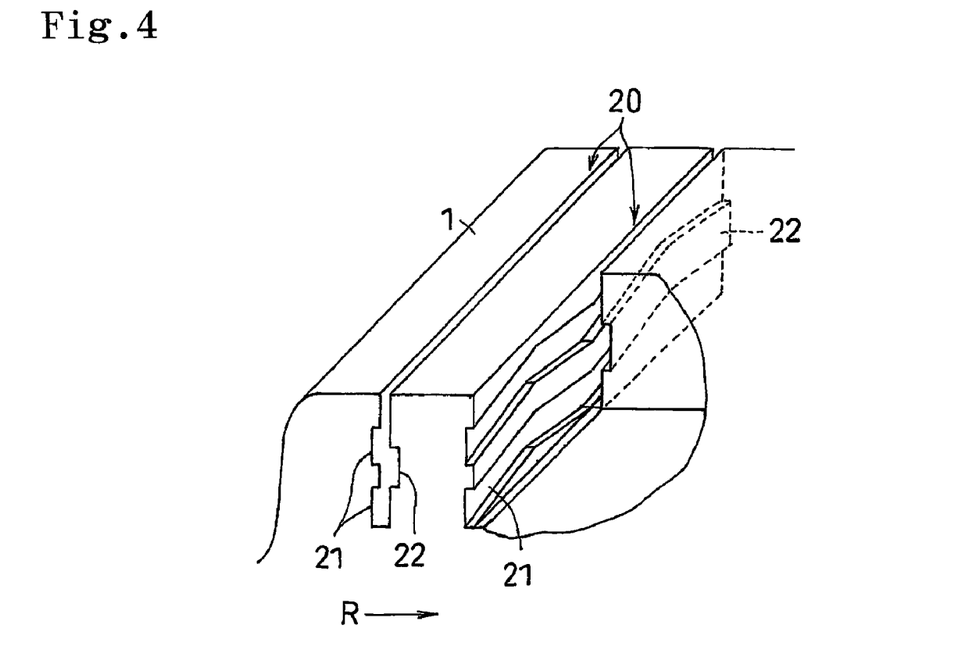
FIG. 4 is a perspective view showing a main portion of a block in accordance with a second embodiment of the present invention in a partly broken manner.
Figure 5:
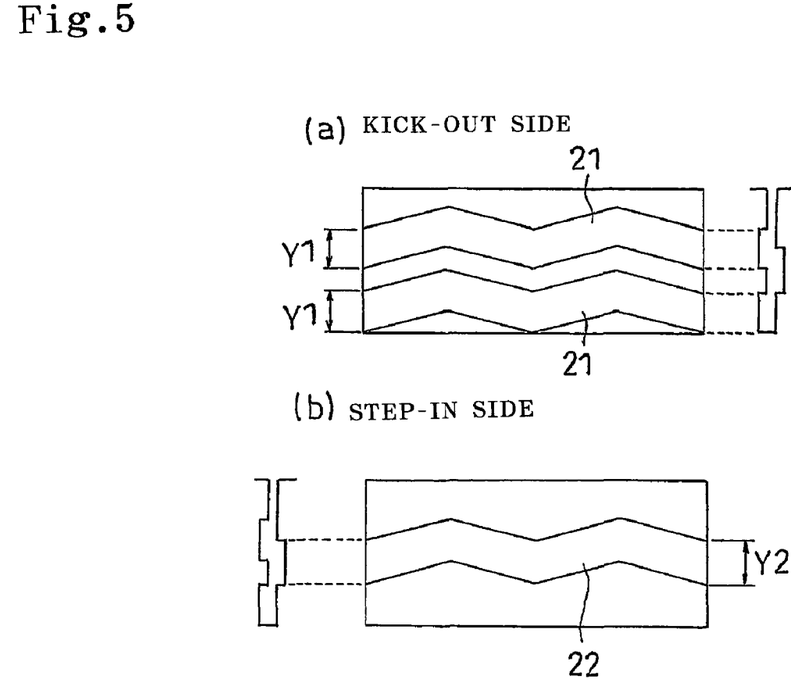
FIG. 5 is a front elevational view showing an inner wall surface of a sipe formed in the block in FIG. 4.

FIG. 4 is a perspective view showing a main portion of a block provided in a tread surface of a pneumatic tire in accordance with the second embodiment of the present invention in a partly broken manner. FIG. 5 is a front elevational view showing an inner wall surface of a sipe formed in the block. In the present embodiment, wide portions 21 and 22 extending in a sipe length direction are formed in each of a kick-out side and a step-in side of a sipe 20, and the wide portions 21 and 22 are formed as a zigzag shape generating undulation in a sipe depth direction.

The zigzag shaped wide portions 21 and 22 tend to be deflected more in the sipe depth direction in comparison with the straight shaped wide portion, and the effect of absorbing the deformation of the tread rubber is great. Further, in the straight shaped wide portion, there is a risk that a load is applied to a boundary portion of a concavity and convexity of a blade corresponding to the wide portion at a time of drawing out the blade serving as a sipe forming metal mold from the tread surface in a tire forming step, and a bending or a breaking of the blade is generated in the portion, however, it is possible to suppress the load applied to the blade in the zigzag shaped wide portions 21 and 22, and it is possible to prevent the trouble mentioned above from being generated.

In the present embodiment, since two wide portions 21 are formed in the kick-out side and one wide portion 22 is formed in the step-in side although the wide portion 21 and the wide portion 22 have the same height and amplitude, the total Z1 of the height Y1 of the wide portion 21 is larger than the total Z2 of the height Y2 of the wide portion 22. Accordingly, it is possible to absorb the deformation of the tread rubber more in the wide portion 21 than the wide portion 22. In a case where the braking force is applied to the tire on the ice road surface, it is possible to uniformize the ground contact pressure applied to the block 1 by decreasing the ground contact pressure of the kick-out side portion of the sipe 20 and it is possible to improve the ice braking performance.

Third Embodiment

Since a third embodiment has the same structure and operation as the first embodiment except the following structure of the sipe, a description will be given mainly of a different point while omitting the common points. In this case, the same reference numerals are attached to the same members and positions as the already described members and positions, and an overlapping description will be omitted.

Figure 6:
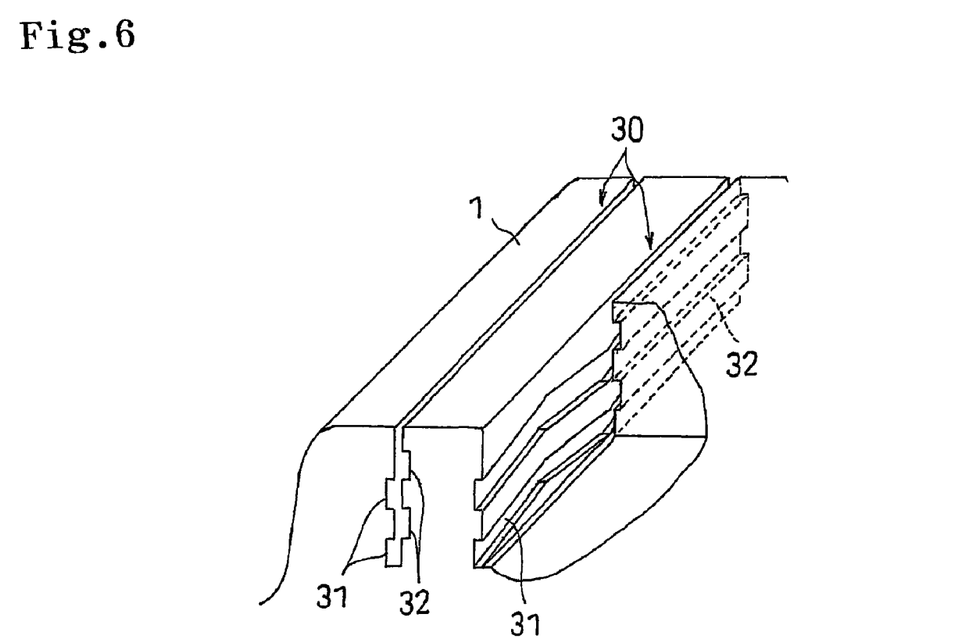
FIG. 6 is a perspective view showing a main portion of a block in accordance with a third embodiment of the present invention in a partly broken manner.
Figure 7:
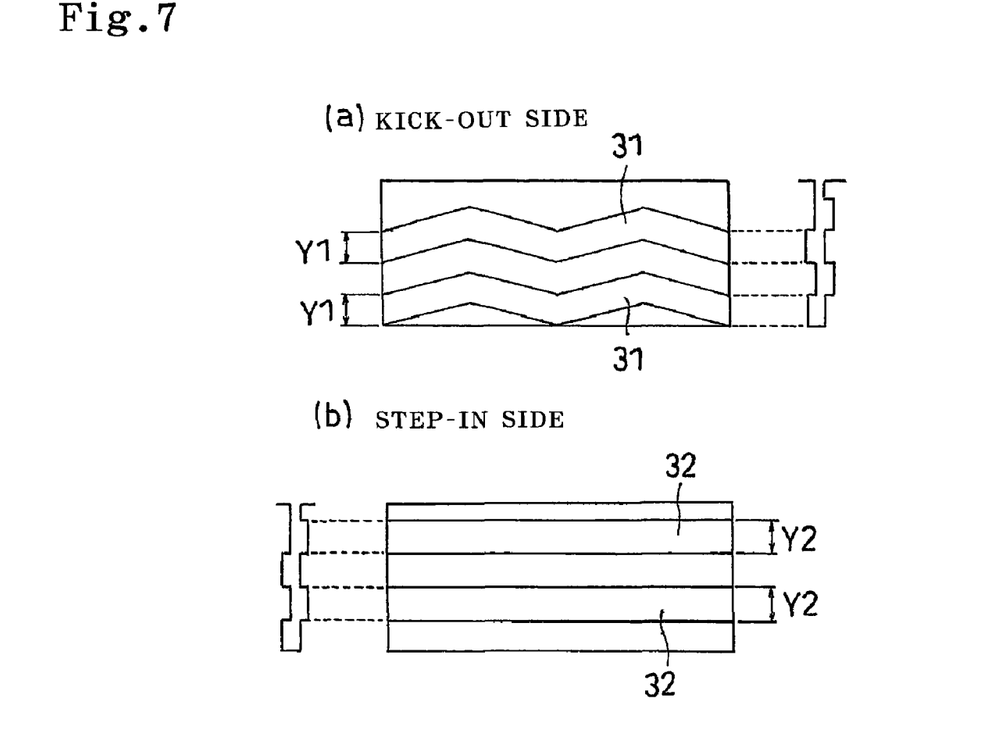
FIG. 7 is a front elevational view showing an inner wall surface of a sipe formed in the block in FIG. 6.

FIG. 6 is a perspective view showing a main portion of a block in accordance with a third embodiment of the present invention in a partly broken manner. FIG. 7 is a front elevational view showing an inner wall surface of a sipe formed in the block. In the present embodiment, wide portions 31 and 32 extending in a sipe length direction are formed in each of a kick-out side and a step-in side of a sipe 30, the kick-out side wide portion 31 is formed as a zigzag shape generating undulation in the sipe depth direction, and the step-in side wide portion 32 is formed as a straight shape.

In the present embodiment, there is shown an example in which the total Z1 of the height Y1 of the wide portion 31 is identical to the total Z2 of the height Y2 of the wide portion 32. As described in the second embodiment, the zigzag shaped wide portion 31 tends to be deflected in the sipe width direction in comparison with the straight shaped wide portion 32, and more absorbs the deformation of the tread rubber. Accordingly, in a case where the braking force is applied to the tire on the ice road surface, it is possible to decrease the ground contact pressure of the kick-out side portion of the sipe 30 so as to uniformize the ground contact pressure applied to the block 1, whereby it is possible to improve the ice braking performance.

In this case, in the same manner as the embodiment mentioned above, it is preferable that the total Z1 of the height Y1 of the wide portion 31 is larger than the total Z2 of the height Y2 of the wide portion 32. In this case, the total Z1 of the height Y1 may be identical to the total Z2 of the height Y2. In this case, it is preferable that an absolute value |Z1−Z2| of a difference between the total Z1 and the total Z2 is 40% or less of the sipe depth D.

Fourth Embodiment

Since a fourth embodiment has the same structure and operation as the first embodiment except the following structure of the sipe, a description will be given mainly of a different point while omitting the common points. In this case, the same reference numerals are attached to the same members and positions as the already described members and positions, and an overlapping description will be omitted.

Figure 8:
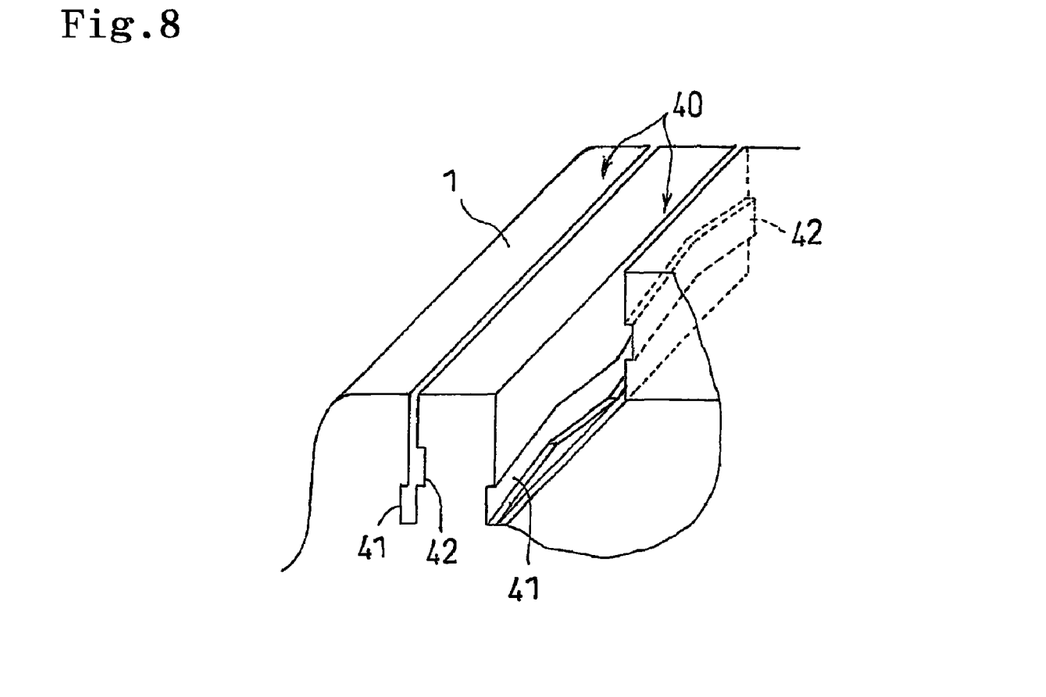
FIG. 8 is a perspective view showing a main portion of a block in accordance with a fourth embodiment of the present invention in a partly broken manner.
Figure 9:
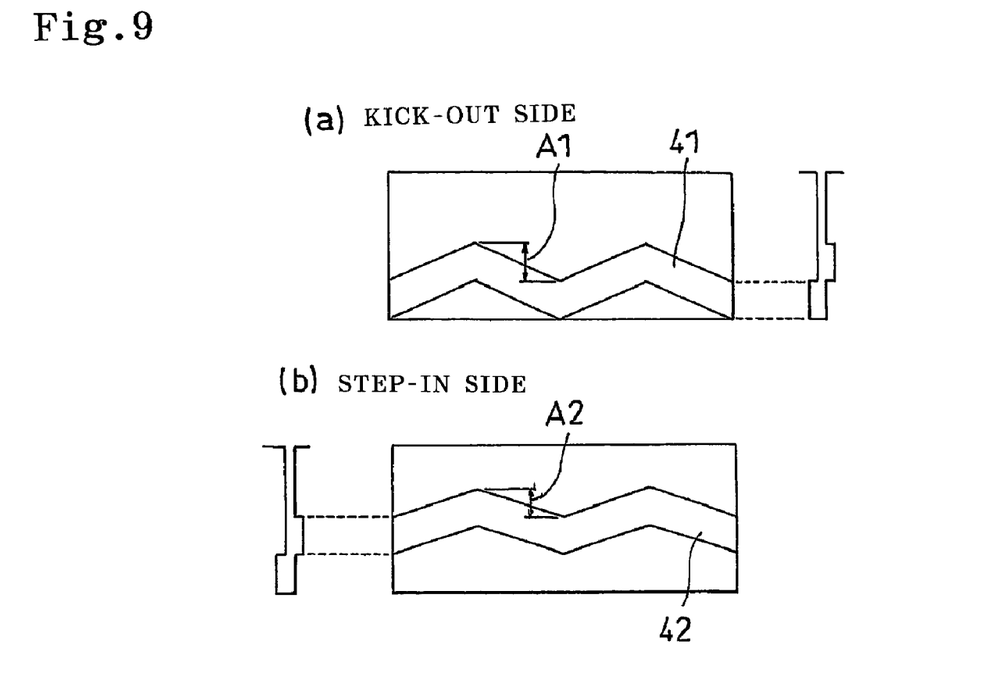
FIG. 9 is a front elevational view showing an inner wall surface of a sipe formed in the block in FIG. 8.

FIG. 8 is a perspective view showing a main portion of a block in accordance with a fourth embodiment of the present invention in a partly broken manner. FIG. 9 is a front elevational view showing an inner wall surface of a sipe formed in the block. In the present embodiment, wide portions 41 and 42 extending in the sipe length direction are formed as a zigzag shape generating undulation in the sipe depth direction, in each of a kick-out side and a step-in side of a sipe 40.

In the present embodiment, there is shown an example in which the total Z1 of the height Y1 of the wide portion 41 is identical to the total Z2 of the height Y2 of the wide portion 42. An amplitude A1 of the wide portion 41 is set larger than an amplitude A2 of the wide portion 42, whereby the wide portion 41 tends to be deflected in the sipe depth direction in comparison with the wide portion 42, and absorbs more deformation of the tread rubber. Accordingly, in a case where the braking force is applied to the tire on the ice road surface, it is possible to decrease the ground contact pressure of the kick-out side portion of the sipe 40 so as to uniformize the ground contact pressure applied to the block 1, whereby it is possible to improve the ice braking performance.

In this case, in the same manner as the embodiment mentioned above, it is preferable that the total Z1 of the height Y1 of the wide portion 41 is larger than the total Z2 of the height Y2 of the wide portion 42. In this case, the total Z1 of the height Y1 may be identical to the total Z2 of the height Y2. In this case, it is preferable that an absolute value |Z1−Z2| of a difference between the total Z1 and the total Z2 is 40% or less of the sipe depth D, and it is preferable that a difference (A1−A2) between the amplitude A1 and the amplitude A2 is 20% or more of the sipe depth D.

Other Embodiment (1) The tread pattern provided in the pneumatic tire in accordance with the present invention is not particularly limited. Accordingly, it is possible to apply to a block having any shapes such as a V shape, a polygonal shape, a curve keynote or the like, in place of the block having the rectangular shape in the plan view. Further, it is possible to employ a rib extending in a linear shape or a zigzag shape along a tire circumferential direction in place of the block or in addition thereto. Further, in the present invention, the sipe structure as mentioned above can be employed with respect to all the land portions within the tread pattern, however, may be employed only with respect to a partial land portion within the tread pattern.

(2) In the embodiment mentioned above, there is shown the example of the both-side open sipe in which both ends of the sipe are open in the sidewall of the block, however, it is possible to employ a one-side open side in which only one end is open, or it is possible to employ a closed sipe in which both ends are closed, in place thereof. Further, the sipe length direction is not limited to the direction which is in parallel to the tire width direction, but may be constituted by a tire circumferential direction or a diagonal direction.

Figure 10:
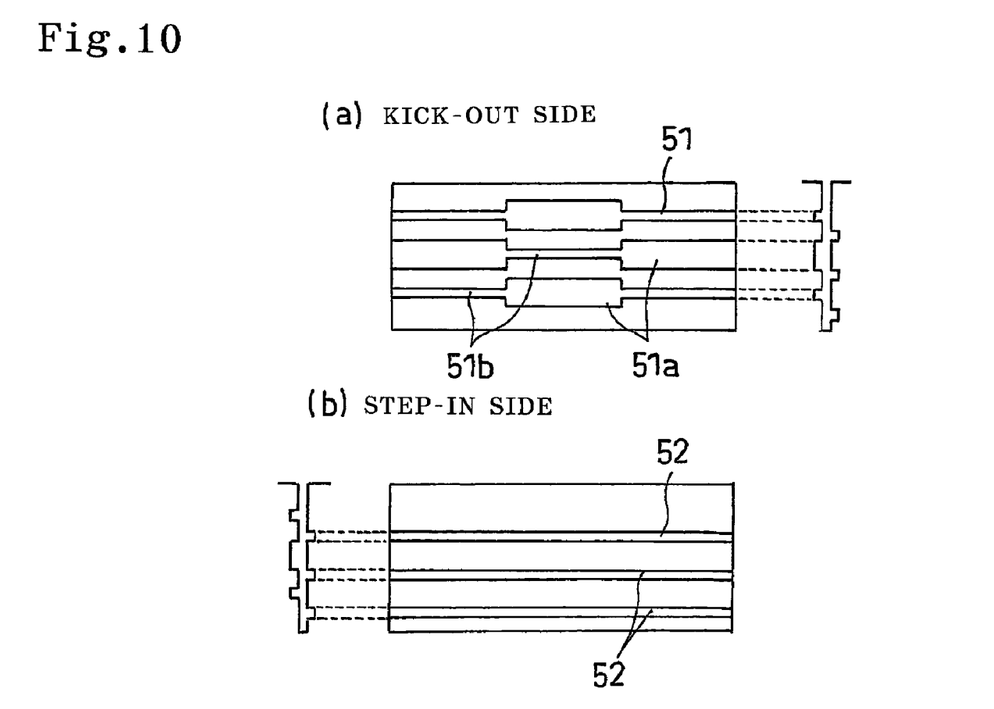
FIG. 10 is a front elevational view showing an inner wall surface of a sipe in accordance with the other embodiment of the present invention.

(3) FIG. 10 is a front elevational view showing an inner wall surface of a sipe in accordance with the other embodiment of the present invention. In this example, every three wide portions 51 and 52 are formed in each of the kick-out side and the step-in side of the sipe, and the kick-out side wide portion 51 is constructed by connecting a first portion 51a having the same height as the wide portion 52 to a second portion 51b having a larger height than the wide portion 52 in the sipe length direction. Further, two second portions 51b are arranged in a center portion of the block, and one second portion 51b is arranged in each of both end portions thereof.

Figure 11:
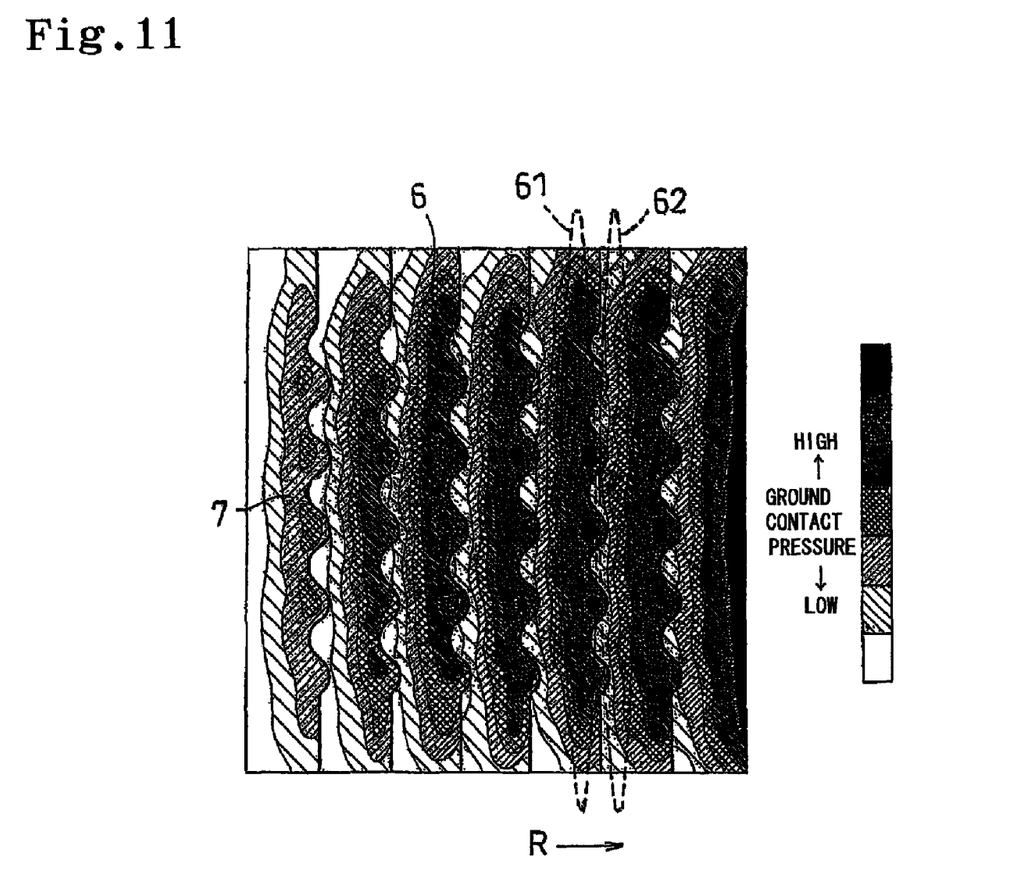
FIG. 11 is a conceptual view showing a ground contact pressure distribution at a braking time of a block forming wide portions.

In the road surface having a low friction coefficient, there is a tendency that the ground contact pressure of the center portion of the land portion becomes high in comparison with both end portions as shown in FIG. 11, however, in accordance with the structure mentioned above, since it is possible to make the deflection tendency in the sipe depth direction of the center portion of the block higher than both end portions while enlarging the total of the heights of the wide portions 51 rather than the total of the heights of the wide portions 52, it is possible to more effectively uniformize the ground contact pressure of the block so as to improve the ice braking performance.

(4) In a case where a plurality of sipes are formed in the block, there is a tendency that the ground contact pressure of the kick-out portion becomes higher in accordance with the sipe closer to the step-in side end of the block, as shown in FIG. 11. Accordingly, in the present invention, it is preferable to make the difference (Z1−Z2) of the total of the heights of the wide portions formed in the sipe smaller step by step, from the step-in side end of the block toward the kick-out side end, whereby it is possible to more preferably uniformize the ground contact pressure applied to the block, and it is possible to improve the ice braking performance.

Example

To concretely show the structure and effect of the present invention, the ice braking performance was evaluated. A tire is installed to an actual car (Japanese FR sedan of 3000 cc class), and a braking distance at a time of traveling on an ice road surface, applying a braking force from a speed 40 km/h and actuating an ABS is measured. An index number evaluation is executed by setting the comparative example to 100, the greater index number indicates an excellent ice braking performance.

A comparative example was set to a tire having a tread pattern as shown in FIG. 1 and making the height Y1 of the wide portion 11 identical to the height Y2 of the wide portion 12 in FIGS. 2 and 3, and an example was set to a tire in which the height Y1 of the wide portion 11 was made larger than the height Y2 of the wide portion 12. A tire size was set to 205/65R15, a sipe depth D was set to 8 mm, a sipe width W is set to 0.3 mm, and protruding heights d1 and d2 of the wide portions 11 and 12 were set to 0.3 mm. Results of the evaluation are shown in Table 1.

TABLE 1

|  | Height Y1 (mm) | Height Y2 (mm) | Ice braking performance |
|---|---|---|---|
| Comparative Example | 1 | 1 | 100 |
| Example | 1.5 | 0.5 | 107 |

From a result of Table 1, it is known that the example can achieve a more excellent ice braking performance than the comparative example, by making the total of the heights of the wide portions in the kick-out side of the sipe larger than the total of the heights of the wide portions in the step-in side.

What is claimed is:

1. A pneumatic tire structured such that a sipe is formed in a land portion of a tread surface,
    wherein wide portions extending in a sipe length direction are wider than an opening portion of the sipe and are formed in each of a kick-out side and a step-in side of said sipe, and a total of heights of said wide portions in the kick-out side of said sipe is made larger than a total of heights of said wide portions in the step-in side of the sipe,
    wherein the sipe width is no less wide than the width of the opening portion at each depth in a sipe depth direction from the opening portion to a bottom portion, and
    wherein the wide portions are formed by concaving an inner wall surface of the sipe, and the cross-sectional shapes thereof are rectangles, wherein the kick-out side and the step-in side have the same number of wide portions, and the height of said wide portions in the kick-out side of said sipe is larger than the height of said wide portions in the step-in side of said sipe.

2. A pneumatic tire structured such that a sipe is formed in a land portion of a tread surface,
    wherein wide portions extending in a sipe length direction are wider than an opening portion of the sipe and are formed in each of a kick-out side and a step-in side of said sipe, said wide portions in the kick-out side of said sipe are formed as zigzag shapes generating undulation in a sipe depth direction, and said wide portions in the step-in side of the sipe are formed as straight shapes along the entire sipe length,
    wherein the sipe width is no less wide than the width of the opening portion at each depth in a sipe depth direction from the opening portion to a bottom portion, and
    wherein the wide portions are formed by concaving an inner wall surface of the sipe, and the cross-sectional shapes thereof are rectangles.

3. A pneumatic tire according to claim 2, wherein an amplitude of the undulation is perpendicular to the sipe length direction.

4. A pneumatic tire structured such that a sipe is formed in a land portion of a tread surface,
    wherein wide portions extending in a sipe length direction are wider than an opening portion of the sipe and are formed as a zigzag shape generating undulation in a sipe depth direction, in each of a kick-out side and a step-in side of said sipe, and an amplitude of said wide portions in the kick-out side of said sipe is made larger than an amplitude of said wide portions in the step-in side of said sipe,
    wherein the sipe width is no less wide than the width of the opening portion at each depth in a sipe depth direction from the opening portion to a bottom portion, and
    wherein the wide portions are formed by concaving an inner wall surface of the sipe, and the cross-sectional shapes thereof are rectangles.

5. A pneumatic tire according to claim 4, wherein the amplitude of the undulation is perpendicular to the sipe length direction.

* * * * *